Feb. 26, 1963 R. G. BOURDEAU 3,078,564
BONDING PROCESS AND PRODUCT THEREOF
Filed Nov. 10, 1959

INVENTOR
Romeo D. Bourdeau
BY
Morse & Altman
ATTORNEY

United States Patent Office 3,078,564
Patented Feb. 26, 1963

3,078,564
BONDING PROCESS AND PRODUCT THEREOF
Romeo G. Bourdeau, Brighton, Mass., assignor to Alloyd
Research Corporation, Watertown, Mass., a corporation of Massachusetts
Filed Nov. 10, 1959, Ser. No. 852,091
4 Claims. (Cl. 29—498)

The present invention relates to diffusion bonding and, more particularly, to the joining together of surfaces composed of materials which heretofore have been difficult to bond by such techniques as soldering, brazing, or welding. In the past, it has been difficult or impossible to join structural components composed of such inorganic materials as ceramics, glasses, refractory metals, graphite, etc. Among the difficulties encountered are deterioration resulting from high temperatures and inability of soldering or brazing compounds to wet such materials adequately. The present invention contemplates a novel bonding technique, by which surfaces composed of materials of the foregoing type may be soldered, brazed or otherwise diffusion bonded.

The object of the present invention is the provision of effective diffusion bonds by first vapor depositing a thin coat of metal on at least one of the surfaces and then diffusion bonding the surfaces under heat, the metal coat ranging in thickness from .00001 inch to .001 inch. It is believed that such a coat may be subjected to a diffusion bonding procedure without deterioration because of its physical-chemical adhesion, which results from vapor deposition, and its extremely thin geometry, by which it can withstand the great stresses generated by differential dimensional change.

Other objects of the present invention will in part be obvious and will in part appear hereinafter.

The invention accordingly comprises the product comprising the construction, combination of elements and arrangement of parts, and the process involving the several steps and the relation and order of one or more of such steps with respect to each of the others, which are exemplified in the following detailed disclosure, and the scope of which will be indicated in the appended claims.

For a fuller understanding of the nature and object of the present invention, reference should be had to the following detailed description, taken in connection with the accompanying drawing, wherein.

Figure 1:
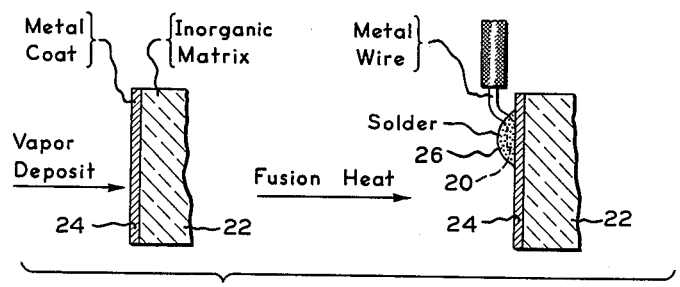
FIG. 1 illustrates the steps of a process of the present invention.

Generally, processes of the present invention contemplate diffusion bonding a pair of contiguous faces by first providing at least one of the faces with a metal coat by reduction from or decomposition of a vapor containing a compound of the metal, the metal coat ranging from .00001 inch to .001 inch in thickness, and then brazing, soldering, or otherwise diffusion bonding the faces to each other with the metal coat therebetween. For best results, the face to be coated should be cleaned, for example, by subjection to an acid (e.g. nitric acid) etch and a distilled water rinse in order to remove substantially all traces of organic material. Bonding may be effected in any of a variety of ways involving interdiffusion of the contiguous faces. In one procedure, the contiguous faces are welded together by the application of sufficient heat to raise them to their melting points. In another procedure, the contiguous faces are brazed or soldered together with the aid of an intermediate flux, such as a stainless steel or silver flux, that is capable of wetting the contiguous faces when fluid. Both of the contiguous faces may be provided with such metal coats by vapor deposition when appropriate. The process of the present invention is particularly applicable to the bonding of materials having melting points above 1000° C., including siliceous materials, for example, ceramics such as aluminum silicate and glasses such as soda glass and potash glass, metals such as beryllium, molybdenum, steel, tungsten, niobium and tantalium, and carbonaceous materials such as graphite.

In order to secure a satisfactory bond between the metal coat and the surface to which it is applied, it is necessary that the coat be composed of a substantially pure metal, either elemental or alloyed, it being particularly important that the metal is substantially oxygen free. Preferably, the metal bearing vapor has a first cationic component selected from the class consisting of the transition metals, rare earth metals, actinide metals and combinations thereof, and an anionic component selected from the class consisting of the organics, halogens and combinations thereof. Examples of the foregoing are: ferric carbonyl, molybdenum carbonyl, nickel carbonyl, chromium chloride, tungsten chloride, molybdenum chloride; bis-cyclopentadienyl compounds such as bis-cyclopentadienyls of iron, manganese, cobalt, nickel, rhodium and vanadium; bis-cyclopentadienyl metal halides such as bis-cyclopentadienyl chlorides, bromides and iodides of titanium, zirconium, hafnium, vanadium and tantalum; cyclopentadienyl carbonyls such as cyclopentadienyl manganese tricarbonyl; bis-cyclopentadienyl metal carbonyls wherein the metal is molybdenum, tungsten or iron; dibenzene metals sucah as dibenzene compounds of chromium, molybdenum and vanadium; and dibenzene metal halides such as dimesitylene di-iodide.

When the metal is deposited from halide vapor by hydrogen reduction, first the hydrogen is passed over or through the solid or liquid metal halide, which is heated in its container to such a temperature that the resultant gas mixture contains from 1 to 30%, by total volume, of metal halide vapor. Next the gas mixture is passed through the coating chamber into contact with the heated specimen. Then the metal halide vapor is reacted at the surface of the heated specimen in order to deposit its metal as an adherent coating. Finally the spent gas is passed out of the chamber. Generally the thermal decomposition process is carried out in analogous fashion, an inert carrier gas, such as argon or helium, being substituted for the hydrogen when the system is at atmospheric pressure. When the system is at reduced pressure, the carrier gas may be omitted entirely.

FIG. 1 illustrates a process of the present invention for joining a metal wire 20 to a glass base 22. First the glass base is cleansed by subjection to nitric acid and rinsed with distilled water, next the glass base is provided with a coat, .0001 inch thick, of a metal 24 such as chromium by vapor deposition from chromium dicumene. Then metal wire 20 is joined to coat 24 by applying a lead-tin solder 26 to both the metal wire and the coat under sufficient heat to liquefy the solder and to wet the wire and the coat. Finally, when the solder joint is cooled, a firm bond is provided.

Figure 2:
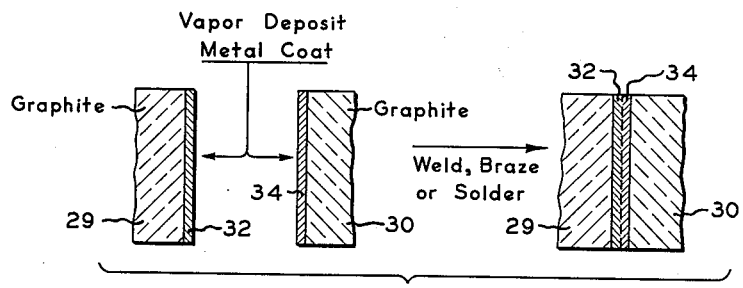
FIG. 2 illustrates the steps of an alternative process of the present invention.

FIG. 2 illustrates a process of the present invention for joining the flat ends of a pair of graphite rods 28 and 30. First the end faces of rods 28 and 30 to be joined are cleansed by subjection nitric acid and rinsed with distilled water. Next the faces are provided with coats, .0001 inch thick, of chromium by vapor deposition from chromium dicumene. Finally the two coats 32 and 34 are pressed together in a protective atmosphere of argon at a temperature of approximately 1200° C. in order to form a secure weld.

Figure 3:
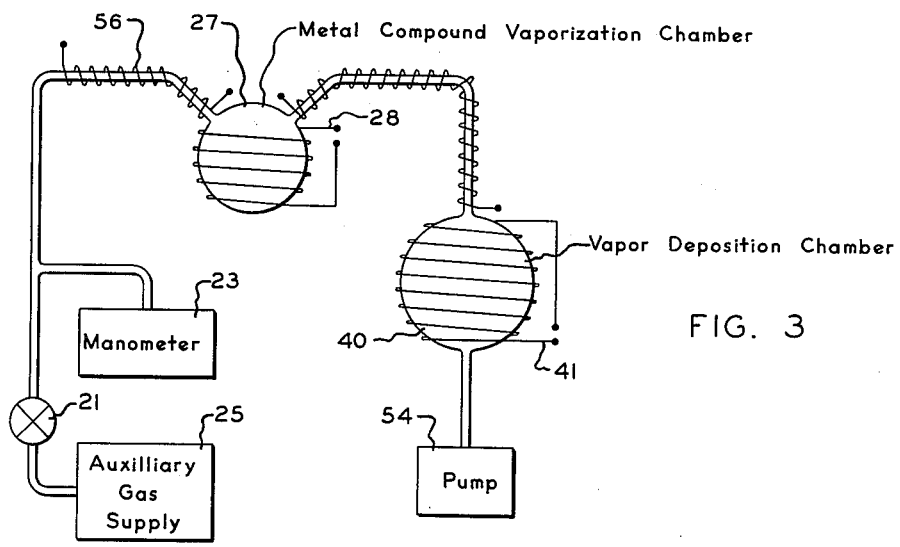
FIG. 3 illustrates an apparatus for effecting certain of the steps of the process of FIGS. 1 and 2.

An apparatus for plating a surface to be bonded in accordance with the present invention is shown in FIG. 3 as including a plating chamber 40. At one end of plating chamber 40, a carrier of a reducing gas and a metal containing vapor are introduced from supplies 25 and 27, respectively. The supply within container 27 is in the form of a powder, the vapor pressure of which is raised by a heater 28 that is kept at constant temperature. At the other end of chamber 40, exhaustion is effected by a pump 54. Surrounding the inlet and outlet tubes of container 26 throughout their lengths are heating coils 56 that maintain the vapor from supply 26 in the gaseous phase and prevent any condensation on the inner surfaces of the tubes. It is apparent that the rate of gas flow from supply 26 may be determined by the temperature of heater 48 and the action of pump 54. Suitable control equipment including a manometer 23, a valve 21 and thermocouples (not shown) are employed. The heating zone ranges in temperature from 300° to 1000° C., the organometallic compounds including the carbonyls, decomposing or undergoing oxidation reduction within the range of from 650° to 1050° C. The pressure of the metal containing vapors preferably ranges from .05 to 25 mm. of Hg. When hydrogen is employed as a reduction gas, the total pressure of the metal vapor and auxiliary gas ranges from .05 to 50 mm. Hg. Preferably the reducing gas when used, is present in excess for the purpose of ensuring that complete reduction and consequent good adhesion occurs.

*Example I*

In a specific example of the foregoing process effected by the above described apparatus, the vapor of molybdenum carbonyl, heated to approximately 90° C., and hydrogen, at approximately 5 times the pressure of the molybdenum carbonyl was introduced. The vapor deposition chamber was heated to a temperature approximately 450° C. The flow rate through the vapor deposition chamber was 20 mols per hour. The thickness of the high quality deposit produced in a period of one half hour was approximately .001 inch.

*Example II*

In another specific example of the foregoing process effected by the above described apparatus, the ½ inch diameter faces of two graphite rods are coated with chromium by raising the temperature of the vapor deposition chamber to 450° C. and passing in contact therewith chromium dicumene at a temperature of 100° C. and a pressure of 30 mm. Hg for a period of 30 min. A sufficient movement of the vapors is continued in order to ensure that the vapor in contact with the faces is fresh. The two coated faces next are pressed together and subjected to a bonding temperature of approximately 1300° C. A firm bond thus is obtained.

Since certain changes may be made in the above processes and products without departing from the scope of the invention herein involved, it is intended that all matter in the above description or shown in the accompanying drawing shall be interpreted in an illustrated and not in a limiting sense.

What is claimed is:

1. A process for joining a pair of components, said process comprising the steps of freely subjecting separated areas of said components to a gas mixture containing from 1 to 30% by total volume of a heat decomposable metal bearing vapor, said metal bearing vapor being selected from the class consisting of ferric carbonyl, molybdenum carbonyl, nickel carbonyl, chromium chloride, tungsten chloride, molybdenum chloride, bis-cyclopentadienyls of iron, manganese, cobalt, nickel, rhodium and vanadium, bis-cyclopentadienyl chlorides, bromides and iodides of titanium, zirconium, hafnium, vanadium and tantalum, cyclopentadienyl manganese tricarbonyl, bis-cyclopentadienyl metal carbonyls wherein the metal is molybdenum, tungsten or iron, dibenzene compounds of chromium, molybdenum and vanadium, and dimesitylene di-iodide, said metal vapor being characterized by a critical temperature at which said heat decomposable condition exists, heating said areas of said components to a temperature in at least as great as said critical temperature in order to deposit said metal thereon in a layer ranging in thickness from .00001 to .001 inch, and pressing said areas together while heating to diffusion bond said areas together.

2. The process of claim 1 wherein the remainder of said gaseous mixture is composed of a gas selected from the inert gases and hydrogen.

3. The process of claim 1 wherein said critical temperature ranges from 300 to 1000° C.

4. A process for joining a pair of components, said process comprising the steps of freely subjecting areas of said components to a gas mixture containing from 1 to 30% by total volume, of a metal bearing vapor containing chromium dicumene, said metal vapor being characterized by a critical temperature at which it decomposes, the pressure of said mixture being approximately 30 mm. Hg, heating said separated areas of said components to a first temperature at least equal to said critical temperature for a period of approximately 30 minutes in order to deposit said chromium on said separated areas in a layer ranging in thickness from .00001 to .001 inch, pressing said separated areas together and heating said areas at a second temperature in excess of said first temperature, said second temperature being approximately 1300° C.

References Cited in the file of this patent

UNITED STATES PATENTS

| | | |
|---|---|---|
| 2,656,284 | Toulmin | Oct. 20, 1953 |
| 2,671,746 | Brew | Mar. 9, 1954 |
| 2,763,576 | Belitz | Sept. 18, 1956 |
| 2,837,818 | Storchheim | June 10, 1958 |
| 2,880,066 | Clossom | Mar. 31, 1959 |
| 2,934,820 | Novak | May 3, 1960 |
| 2,970,068 | Drummond | Jan. 31, 1961 |